United States Patent [19]

McDonald

[11] 4,297,256

[45] Oct. 27, 1981

[54] PREPARATION OF WATER-IMMISCIBLE, ACID-SOLUBLE N-(AMINOMETHYL)-$\alpha,\beta$-ETHYLENICALLY UNSATURATED CARBOXAMIDES, QUATERNARY DERIVATIVES AND POLYMERS THEREOF

[75] Inventor: Charles J. McDonald, Midland, Mich.

[73] Assignee: The Dow Chemical Company, Midland, Mich.

[21] Appl. No.: 106,823

[22] Filed: Dec. 26, 1979

[51] Int. Cl.$^3$ .............................................. C08L 33/24
[52] U.S. Cl. .................... 260/29.4 UA; 260/29.6 WQ; 526/307; 564/204
[58] Field of Search .................. 260/29.4 R, 29.4 UA, 260/29.6 WQ, 561 R, 561 N; 526/307

[56] References Cited

U.S. PATENT DOCUMENTS

| | | | |
|---|---|---|---|
| 3,178,385 | 4/1965 | Dinges | 260/29.4 |
| 3,349,121 | 10/1967 | Muller | 260/513 |
| 4,049,606 | 9/1977 | Hunter | 260/29.4 UA |
| 4,179,424 | 12/1979 | Phillips | 260/29.4 UA |

*Primary Examiner*—Paul R. Michl

[57] ABSTRACT

Water-immiscible, acid-soluble N-(aminomethyl)-$\alpha,\beta$-ethylenically unsaturated carboxamides such as N-(diethylaminomethyl)acrylamide are readily prepared by (1) reacting under acidic conditions a carboxamide such as acrylamide with a lower aldehyde such as formaldehyde and a moderately water-soluble secondary amine such as diethylamine and (2) recovering the resulting water-immiscible aminomethyl derivative of carboxamide from the acidic reaction mixture by adjusting the pH of the reaction mixture to a value of 7 or higher, whereby the water-immiscible derivative separates from the reaction mixture.

15 Claims, No Drawings

PREPARATION OF WATER-IMMISCIBLE, ACID-SOLUBLE N-(AMINOMETHYL)-α,β-ETHYLENICALLY UNSATURATED CARBOXAMIDES, QUATERNARY DERIVATIVES AND POLYMERS THEREOF

BACKGROUND OF THE INVENTION

This invention relates to a process for preparing cationic carboxamide monomers and their polymers.

Cationic polyacrylamides are known to be excellent flocculants for the treatment of sewage and aqueous suspensions of other organic and inorganic particulates. Probably the best known cationic polyacrylamides are those prepared by reacting polyacrylamide with formaldehyde and a dialkylamine. See, for example, U.S. Pat. Nos. 2,328,901; 3,539,535 and 3,979,348 as well as Suen and Schiller in *Industrial Engineering Chemistry*, Vol. 49, pages 21–32 (1956). Unfortunately, the cationic polyacrylamides prepared by these processes exhibit undesirable amine odors and are less stable than desired for many applications.

Attempts have been made to prepare such cationic polyacrylamides from corresponding cationic monomers. See, for example, U.S. Pat. No. 3,256,140. The results of such attempts have not been entirely satisfactory due to the substantial amount of saturated impurities resulting from the addition of the amine reactant across the ethylenic group of the acrylamide.

It has also been observed that the cationic polyacrylamides prepared by polymerizing water-miscible cationic acrylamides in aqueous solution often contain substantial amounts of undesirable gelled or crosslinked materials. Similar problems, as well as problems caused by very viscous reaction mixtures, often arise when such water-miscible cationic polyacrylamides are converted to the quaternary derivatives in aqueous solution. Attempts to minimize these problems by carrying out said reactions in very dilute aqueous solutions have been unsatisfactory from an economic viewpoint.

In view of the aforementioned deficiencies of the prior art methods, it would be highly desirable to provide an economical process for preparing cationic carboxamides and polymers thereof which are odorless and essentially free of gelled products and other undesirable impurities.

SUMMARY OF THE INVENTION

In one aspect, the present invention is a process for preparing a water-immiscible, acid-soluble N-(aminomethyl) carboxamide, which process comprises (1) contacting an aqueous reaction mixture containing carboxamide with a lower aldehyde and a moderately water-soluble amine at a pH of less than about 7 under other conditions sufficient to cause reaction of the carboxamide, aldehyde and amine to form at least 5 mole percent (based on moles of carboxamide) of the desired water-immiscible, acid-soluble N-(aminomethyl) derivative of the carboxamide, hereinafter called cationic carboxamide and (2) increasing the pH of the resulting reaction mixture to a value of at least 7, thereby causing the water-immiscible derivative to separate from the reaction mixture. To be water-immiscible, the derivative forms a separate phase when 5 weight percent of the derivative based on the weight of water is dispersed in water at pH of 7 at 20° C. For the purposes of this invention, a moderately water-soluble amine is one which reacts with formaldehyde to form an adduct which is insoluble, i.e., less than 5 weight percent of adduct will dissolve in water at 20° C., in water at pH of 7. If desired, the resulting cationic carboxamide derivative can be readily quaternized by contacting it with a quaternizing agent such as methyl chloride or dimethyl sulfate.

When the cationic carboxamide derivative is an α,β-ethylenically unsaturated derivative, the derivative may be polymerized by subjecting it to conditions of free-radical initiated addition polymerization. Since the derivative is water-immiscible, such a polymerization can be carried out in a nonaqueous medium or dispersed as a discontinuous phase in a basic aqueous medium as is characteristic of oil-in-water (latex) emulsion polymerization.

As would be expected, the water-immiscible cationic carboxamide polymers of the present invention are usefully employed in the flocculation of dispersed particulate solids from aqueous suspension, for example, sewage, effluents from paper manufacturing operations and industrial mining operations. Moreover, these cationic polymers exhibit excellent activity as paper drainage and dry strength additives.

DETAILED DESCRIPTION OF THE INVENTION

Carboxamides preferably employed in the practice of this invention are those unsaturated compounds which contain one or more

(ethylenic groups) which are conjugated or isolated in relation to one or more carboxamide

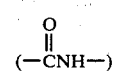

radicals. Such carboxamides are advantageously dispersible in the reaction medium under conditions used in preparing the cationic carboxamides. Preferably, the carboxamides are soluble in the acidic aqueous medium to be employed in preparing the cationic carboxamide, i.e., they will form at least a 5 weight percent solution. Of particular interest in the present invention are the α,β-ethylenically unsaturated aliphatic monocarboxamides, especially those represented by the structural formula:

wherein $R_1$ is hydrogen, alkyl or cycloalkyl and $R_2$ is hydrogen, alkyl, hydroxyalkyl or similar substituent that is inert in the reaction to form the cationic carboxamide. Preferably, $R_1$ is hydrogen, methyl or ethyl and $R_2$ is hydrogen, methyl, ethyl or hydroxyethyl, most preferably hydrogen. Exemplary preferred unsaturated carboxamides include acrylamide, methacrylamide, ethacrylamide, N-methylmethacrylamide, N-methylacrylamide, N-ethylacrylamide, N-hydroxyethylacrylamide and the like, with acrylamide being most preferred.

Also suitable for the purposes of this invention are water-soluble polymers of the aforementioned unsaturated carboxamides, particularly homopolymers of acrylamide as well as copolymers thereof with other comonomers such as acrylic acid and the like.

Amines employed in the practice of this invention are advantageously moderately water-soluble secondary amines which are dispersible in the aqueous reaction medium under the acidic conditions used to prepare the cationic carboxamide. Preferably, they are soluble in the acidic reaction medium, e.g., they will form at least a 5 weight percent solution in an aqueous medium having a pH less than about 7. Of particular interest are secondary amines represented by the structural formula:

$$HN(R_3)_2 \qquad II$$

wherein each $R_3$ is individually hydrocarbyl having two or more carbons such as ethyl and high alkyls, cycloalkyl, alkenyl, aryl or arylalkyl. Alternatively, the $R_3$ groups are collectively hydrocarbylene having at least four carbons such as alkylene, alkenylene or other divalent hydrocarbon radical or inertly substituted diradical which when taken with the amino nitrogen, forms a heterocyclic ring having five or six members. The diradical, while preferably predominantly hydrocarbon, may be alkylaminoalkyl, alkoxyalkyl, alkylthioalkyl and the like. "Hydrocarbyl" as used herein is a monovalent hydrocarbon radical. Preferably, $R_3$ is alkyl especially lower alkyl having from two to eight carbon atoms or alkenyl having from three to eight carbon atoms. Exemplary amines include diethylamine, dibutylamine, piperadine, pyrrolidine and diallylamine. Of the foregoing amines, the dialkylamines, wherein alkyl has more than two carbons, such as diethylamine and dibutylamine and dialkenylamine such as diallylamines are especially preferred.

For the purposes of this invention, it is understood that the term "lower aldehyde" means aldehydes having one to three carbons and materials which will generate such lower aldehydes under the conditions of the process of this invention. Examples of aldehydes include formaldehyde, acetaldehyde and propionaldehyde with formaldehyde being preferred. Examples of materials containing or having the capability of generating aldehydes include paraformaldehyde, formalin and trioxymethane.

The reaction of the carboxamide with the moderately water-soluble amine and aldehyde is advantageously carried out in acidic aqueous solution, preferably in a solution containing from about 8 to 30 weight percent of the carboxamide, from about 2 to about 14 weight percent of aldehyde and from about 4 to about 30 weight percent of the amine. The recited concentration range of amine is given as weight percent of free amine, even though the amine is in salt form under reaction conditions.

Although not critical, it is often desirable to prereact the amine with aldehyde under basic conditions to form an adduct. This adduct is subsequently reacted with the carboxamide in an acidic aqueous medium. In such instances, the adduct is normally prepared by reacting an aqueous solution of aldehyde with the amine to form an adduct that is miscible in an acidic aqueous medium but is immiscible in water or basic aqueous medium. While the reaction may take place at ambient or elevated temperatures, in most instances the reaction proceeds at a sufficiently rapid rate at ambient temperature. The molar ratio of the aldehyde to the amine may vary over a wide range but the preferred ratio is usually within the range from about 10 to 1 to about 1 to 10, most preferably, a ratio of aldehyde to amine from 2 to 1 to 1 to 2. While it is generally desirable to prepare this adduct in as concentrated form as possible in order to minimize dilution effects, the concentration of the adduct in the acidic aqueous medium should be from about 30 to about 60 weight percent, most preferably from about 38 to about 53 weight percent. The amine contribution is calculated as if it were free amine even though it is in salt form.

Generally, the reaction of amine and aldehyde or adduct thereof with carboxamide is carried out in an acidic aqueous medium.

In reacting the aldehyde and amine separately or as the adduct with an unsaturated carboxamide such as acrylamide, the aqueous reaction mixture is preferably maintained at a pH from about 0.02 to about 6 and most preferably from about 1 to about 4. When the reaction is carried out using a carboxamide polymer such as polyacrylamide, the pH of the reaction mixture is maintained at a pH from about 0.02 to about 7, preferably from about 2 to about 6. The temperature of the reaction is not particularly critical and is suitably any temperature which provides the desired reaction. Generally, however, the reaction temperature ranges from about 20° to about 90° C., preferably from about 30° to about 60° C. While the reaction time required to achieve the desired conversion to cationic carboxamide will decrease as temperature increases, effective reaction normally occurs within 60 to about 240 minutes at intermediate reaction temperatures from about 40° to about 65° C. In any event, the reaction is continued for a period of time sufficient to convert the carboxamide moiety to the desired cationic form.

As mentioned hereinbefore, the pH of the reaction mixture is critical. Therefore, it is desirable that the reactants as they are supplied to the reaction mixture be maintained at pH's below the aforementioned critical limit. Accordingly, it is a common practice to acidify the reaction mixture and/or reactants being supplied to the reaction mixture with hydrogen chloride or some other strong acid.

While the reaction is suitably carried out in a reaction medium that is essentially aqueous, the reaction is also usefully practiced in a medium that is essentially a water-in-oil emulsion. In such practice, aqueous solutions of one or more of the reactants are dispersed in an oil phase usually with the aid of a water-in-oil emulsifier. The proportions of ingredients (i.e., oil phase, aqueous phase, emulsifier, etc.) in such practices are similar to those conventionally employed in water-in-oil polymerization of water-soluble monomers, e.g., as in U.S. Pat. No. 3,284,393 and water-in-oil Mannich reactions, e.g., U.S. Pat. No. 3,979,349.

In carrying out the reaction to form the cationic carboxamide, it is often desirable to include a small amount of a polymerization inhibitor, such as hydroquinone, t-butylpyrocatechol and copper sulfate, in conventional quantities from about 0.02 to about 0.1 weight percent based on the carboxamide reactant.

Following formation of the desired cationic carboxamide, the product of the reaction is isolated by adjusting the pH of the reaction mixture to a value above a pH of 7. When the reaction mixture reaches a pH of 7 or more, the cationic carboxamide product separates from the aqueous phase as the cationic carboxamide (neat) or as a nonaqueous solution if a nonaqueous solvent is employed.

The cationic $\alpha,\beta$-ethylenically unsaturated carboxamide reaction product preferably obtained in the practice of this invention has the general appearance of an oil which is water-immiscible under slightly alkaline conditions, e.g., pH of 7.5, but which is soluble in an aqueous medium of slightly acidic conditions, e.g., pH of 6.0 to 6.5. The resulting preferred cationic carboxamides are represented by the formula:

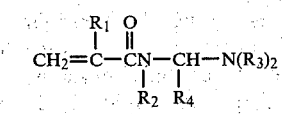

wherein $R_1$, $R_2$ and $R_3$ are as defined hereinbefore and $R_4$ is hydrogen or alkyl having 1 or 2 carbons. Especially preferred cationic unsaturated carboxamides are, N-(diethylaminomethyl)acrylamide and N-(diallylaminomethyl)acrylamide. These cationic carboxamide monomers polymerize readily under conditions of addition polymerization normally employed in polymerizing water-soluble monomers. These carboxamides can be stored for periods dissolved in water-immiscible liquids without decomposing as aqueous solutions of such carboxamides often do.

In the polymerization of the resulting cationic unsaturated carboxamide, the cationic carboxamide is polymerized in a water-immiscible medium under conditions which are otherwise generally conventional for the free-radical initiated, addition polymerization of carboxamide and N-substituted carboxamide monomers. In one embodiment, the cationic carboxamide monomer, dissolved or dispersed in a water-immiscible medium containing a free-radical generating initiator such as a peroxide or an azo-type initiator is subjected to polymerization conditions such as temperatures from about 20° to about 60° C., preferably from about 25° to about 40° C. This polymerization is advantageously carried out at approximately atmospheric pressure wherein the gas over the reaction mixture is essentially free of oxygen and is preferably a gas inert to the polymerization such as nitrogen. The molecular weight of the polymer may be regulated by conventional chain transfer agents.

In a second embodiment, the polymerization of the cationic carboxamide monomer is carried out in an oil-in-water emulsion wherein the water-immiscible cationic carboxamide monomer or mixture thereof with one or more other water-immiscible monomer resides in the water-immiscible or oil phase. In such an emulsion, the monomer may constitute the entire oil or water-immiscible phase (neat) or it may dissolve in a hydrocarbon diluent such as hexane, kerosene, diesel fuel or the like. The polymerization catalyst is a free-radical generating catalyst which may be oil soluble such as an azotype, e.g., azobis(isobutyronitrile) or water soluble such as sodium persulfate. This polymerization is carried out under conventional emulsion polymerization conditions to form a latex (i.e., aqueous colloidal dispersion) wherein the polymer of the cationic carboxamide exists as a colloidal size particulate dispersed in a continuous aqueous phase.

With the exception of the preferred pH range of the reaction mixture, the procedure for carrying out the reaction of amine and aldehyde or adduct thereof with a carboxamide polymer is generally the same as stated for carrying out the reaction with the carboxamide monomer.

The resulting polymer is then recovered by conventional procedures and may be employed itself as a flocculating agent or may be quaternized to form a polymer having further enhanced flocculating characteristics. Such quaternization reactions are well known and may be conducted by contacting the resulting polymer in aqueous solution and in acidic conditions. Alternatively, the quaternization reaction may be carried out in a nonaqueous medium or in a water-in-oil or oil-in-water emulsion as desired. The quaternizing agent is advantageously an alkyl or aryl halide, or a dialkyl sulfate such as dimethyl sulfate. Preferably, in such quaternizing agents, alkyl has one or two carbons and alkylene has two or three carbons. Examples of preferred quaternizing agents include methyl chloride, dimethyl sulfate and methyl bromide. Suitable conditions for quaternization of the polymer are described in British Pat. No. 887,900.

In some instances, it is desirable to quaternize the unsaturated cationic carboxamide prior to polymerization. In such instances, the quaternization reaction preferably is carried out using the process of this invention wherein the cationic carboxamide is dissolved or dispersed in an aqueous phase having a pH from about 3 to about 5. Following quaternization of the monomer, it may be recovered in essentially pure form prior to polymerization or the resulting quaternization mixture may be subject to polymerization conditions similar to those employed in polymerizing the cationic carboxamide monomer.

The following examples are given to illustrate the invention but should not be construed as limiting the scope thereof. Unless otherwise indicated, all parts and percentages of these examples are by weight.

EXAMPLE 1

To a 3-necked, round bottomed flask equipped with a thermometer, magnetic stirrer and a pH electrode are added 1 part of paraformaldehyde containing 96 percent of formaldehyde and 2.4 parts of diethylamine. The paraformaldehyde is added slowly to control the reaction temperature below 45° C. After a reaction time of 2 hours, the resulting formaldehyde-resin adduct is then acidified to a pH of 3 by slowly adding 10 parts of a 30 percent aqueous solution of hydrochloric acid. During the addition of the hydrochloric acid, the reaction mixture is cooled with an ice bath to maintain the reaction mixture at a temperature below 20° C.

The resulting acidified product is then added to 4.7 parts of a 48 percent aqueous solution of acrylamide which has previously been acidified with hydrochloric acid to a pH of 3. The resulting mixture is heated to 65° C. and maintained there with stirring for a period of two hours. Using carbon magnetic resonance spectroscopy (CMR) analysis, the resulting composition is determined to contain 80 mole percent of N-(diethylaminomethyl)acrylamide and less than 5 mole percent of saturated impurity. Upon increasing the pH of the reaction mixture to a pH of 10, the mixture separates into an aqueous phase and a hydrophobic phase containing the N-(diethylaminomethyl)acrylamide.

EXAMPLE 2

To the apparatus employed in Example 1 are added 81.1 parts of a formalin solution containing 37 percent of formaldehyde and 147.0 parts of a 48.2 percent aqueous solution of acrylamide, both of which have been acidified with hydrochloric acid to a pH of 2. To this homogeneous solution are added 100 parts of an aqueous amine reagent containing 97 percent of diallylamine in a remaining amount of 38 percent hydrochloric acid. This reagent also has a pH of 2. The resulting reaction mixture is heated at 65° C. for two hours. Analysis of the resulting reaction product by carbon magnetic resonance indicates conversion to 80 mole percent of N-(diallylaminomethyl)acrylamide. Upon increasing the pH of the reaction mixture to a value above 7 by adding 50 percent solution of sodium hydroxide in water, the reaction mixture separates into an aqueous phase and a hydrophobic phase containing N-(diallylaminomethyl)acrylamide.

EXAMPLE 3

In a reaction vessel equipped with thermometer and pH electrode are added 5 parts of a 38 percent aqueous solution (pH of 2) of the cationic acrylamide monomer of Example 1 and 2 parts of a >99 percent pure dimethyl sulfate reagent. An aqueous solution of 50 percent sodium hydroxide is then added portionwise to the heterogeneous mixture to maintain the pH around 3.0. As the quaternization reaction proceeds, the temperature is maintained between 30°–35° C. The clear product, analyzed by CMR, comprises >80 mole percent of N-(methyltriethylammoniummethyl)acrylamide salt and less than 5 mole percent saturated by-product.

EXAMPLE 4

Into a 500 ml resin pot equipped with a stirrer, thermometer and nitrogen purge tube are added 75 parts of a 30 percent aqueous solution (pH of 1) of the cationic acrylamide of Example 1 and 375 parts of deionized water. The mixture is adjusted to a pH of 3 with a 50 percent aqueous solution of sodium hydroxide and purged for one hour with nitrogen. As an initiator, an aqueous solution of a conventional redox catalyst is injected through a port into the vessel. The reaction is allowed to proceed over a two-hour period at 30° C. The resulting viscous polymer solution is then heated to 50° C. and a second shot of the aforementioned initiator is introduced. After the polymer solution is heated for two hours at 65° C., the polymerization is terminated and the resulting polymer of the cationic acrylamide is recovered by adding sufficient base to the reaction mixture to increase the pH of the mixture to a value of 9 thereby causing the polymer to precipitate from the aqueous phase of the reaction mixture. The precipitate is collected by filtration.

EXAMPLE 5

To the resin pot used in Example 4 is added a water-in-oil emulsion containing the following ingredients:
 298 parts of a 36 percent aqueous solution (pH of 3) of the cationic acrylamide of Example 1;
 56 parts of deionized water;
 140 parts of Isopar ® M (a mixture of isoparaffinic hydrocarbons having a flash point of 170° F.) and
 11 parts of isopropanolamide of oleic acid.
The resin pot containing the foregoing emulsion is heated to 30° C. and purged with nitrogen for one hour. Polymerization of the cationic acrylamide at pH of 3 is effected by adding a conventional redox catalyst to the emulsion and maintaining the emulsion at 30° C. for three hours. The emulsion is then heated at 50° C. for one hour to yield a water-in-oil emulsion of poly[N-(diethylaminomethyl)acrylamide].

EXAMPLE 6

To the resin pot used in Example 4 is added an oil-in-water emulsion containing the following ingredients:
 45 parts of the cationic acrylamide of Example 1;
 55 parts of aqueous phase having a pH of 9; and
 0.5 part of sodium salt of dodecylated sulfonated phenyl ether.
The resin pot containing the foregoing emulsion is heated to 60° C. and purged with nitrogen for one hour. Polymerization of the cationic acrylamide at a pH of 9 is effected by adding a conventional oil-in-water emulsion polymerization catalyst such as sodium persulfate to the emulsion and maintaining the emulsion at 60° C. for 6 hours. The emulsion is then heated at 60° C. for one hour to yield an oil-in-water emulsion (latex) of poly[N-(diethylaminomethyl)acrylamide].

What is claimed is:

1. A process for preparing an acid soluble water-immiscible N-(aminomethyl)carboxamide (cationic carboxamide) which comprises (1) contacting a reaction mixture comprising an aqueous phase and a carboxamide reactant represented by the formula:

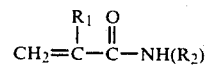

wherein $R_1$ is hydrogen or alkyl and $R_2$ is hydrogen or an inert substituent with an aldehyde having 1 to 3 carbons and a moderately water-soluble amine under conditions including a pH of less than about 7 sufficient to cause reaction of the carboxamide reactant, aldehyde and amine to form at least 5 mole percent of the water-immiscible cationic carboxamide based on moles of the carboxamide reactant and (2) thereafter increasing the pH of the resulting reaction mixture to a value of at least 7, thereby causing the water-immiscible cationic carboxamide to separate from the aqueous phase of the reaction mixture.

2. The process of claim 1 wherein the amine is a secondary amine represented by the formula:

wherein each $R_3$ is individually hydrocarbyl or inertly substituted hydrocarbyl wherein hydrocarbyl has 2 or more carbons and the cationic carboxamide is represented by the formula:

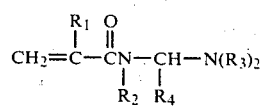

wherein $R_1$, $R_2$ and $R_3$ are as defined herein and $R_4$ is hydrogen or alkyl having one or two carbons.

3. The process of claim 2 wherein the ingredients of the reaction mixture are combined in an aqueous medium such that the pH of the reaction mixture is less than about 5.

4. The process of claim 2 wherein $R_1$ is hydrogen, methyl or ethyl, $R_2$ is hydrogen or alkyl and $R_3$ is alkyl, alkenyl, hydroxyalkyl or aminoalkyl.

5. The process of claim 4 wherein the carboxamide reactant is acrylamide, the aldehyde is formaldehyde or a material selected from paraformaldehyde, formalin and trioxymethane, the amine is a diethylamine, dibutylamine or diallylamine, and the pH of the reaction mixture is 3 or less.

6. The process of claim 1 wherein the reaction mixture is dissolved in an aqueous medium and dispersed in an oil phase to form a water-in-oil emulsion prior to the reaction to form the cationic carboxamide.

7. The process of claim 1 wherein the amine and aldehyde are prereacted to form an adduct which is immiscible with an aqueous phase having a pH of 7 or more.

8. The process of claim 2 which process comprises the additional step of subjecting the cationic carboxamide to conditions of free-radical initiated addition polymerization at pH less than about 7.

9. The process of claim 8 wherein the cationic carboxamide dissolved in the aqueous phase of a water-in-oil emulsion is subjected to polymerization conditions thereby forming a water-in-oil emulsion wherein the aqueous phase contains the polymer.

10. The process of claim 2 wherein the cationic carboxamide is quaternized by contacting the cationic carboxamide with a quaternizing agent to form a reaction mixture having a pH below 7.

11. The process of claim 10 wherein the cationic carboxamide is an N-(dihydrocarbylaminomethyl)acrylamide wherein hydrocarbyl is ethyl, butyl or allyl and the quaternizing agent is an alkyl halide or dialkyl sulfate wherein alkyl is 1 or 2 carbons and alkylene is 2 to 3 carbons and the pH of the reaction mixture is from about 3 to about 5.

12. The process of claim 1 wherein the cationic carboxamide monomer or mixture thereof with one or more other water-immiscible monomers residing in the oil phase of an oil-in-water emulsion is subjected to emulsion polymerization conditions to form an aqueous dispersion wherein the polymer of the cationic carboxamide exists as a colloidal size particulate dispersed in a continuous aqueous phase.

13. The process of claim 2 wherein $R_3$ is hydrocarbyl.

14. The process of claim 13 wherein hydrocarbyl is alkyl or alkenyl.

15. The process of claim 14 wherein $R_3$ is alkyl.

* * * * *